United States Patent [19]

Freeman

[11] Patent Number: 5,229,176
[45] Date of Patent: Jul. 20, 1993

[54] PROTECTIVE SLEEVE AND METHOD OF ASSEMBLING THE PROTECTIVE SLEEVE TO AN OBJECT TO BE PROTECTED

[75] Inventor: David S. Freeman, Austin, Tex.

[73] Assignee: Minnesota Mining And Manufacturing Company, St. Paul, Minn.

[21] Appl. No.: 707,346

[22] Filed: Jun. 4, 1991

[51] Int. Cl.$^5$ ............................................. F16L 11/08
[52] U.S. Cl. .................................. 428/34.7; 428/34.5; 428/34.6; 428/35.2; 428/35.8; 428/36.1; 428/36.8; 428/36.91; 428/33; 428/245; 428/447; 138/126
[58] Field of Search ................. 428/34.5, 34.6, 34.7, 428/35.2, 35.8, 36.1, 36.8, 36.9, 36.91, 36.92, 621, 33, 68, 76, 101, 212, 228, 245, 257, 365, 367, 408, 421, 429, 447, 465, 475.5, 480, 494, 524, 689; 138/126

[56] References Cited

U.S. PATENT DOCUMENTS

| 4,139,159 | 2/1979 | Inoue et al. | 428/34.5 |
| 4,271,329 | 6/1905 | Perelmuter | 156/86 |
| 5,000,228 | 3/1991 | Manent et al. | 138/124 |

FOREIGN PATENT DOCUMENTS

| 0148100 | 7/1985 | European Pat. Off. . |
| 0149032 | 7/1985 | European Pat. Off. . |
| 114718 | 8/1975 | Fed. Rep. of Germany . |
| 3400202A1 | 7/1985 | Fed. Rep. of Germany . |
| 1292608 | 10/1972 | United Kingdom . |

*Primary Examiner*—Ellis P. Robinson
*Assistant Examiner*—Charles R. Nold
*Attorney, Agent, or Firm*—Gary L. Griswold; Walter N. Kirn; David W. Anderson

[57] ABSTRACT

An elastomeric tube for environmentally protecting and/or electrically insulating an object and a separate sleeve having low surface friction disposed in the tube to facilitate assembly of the tube to the object. Methods of assembling the tube to the object are also disclosed.

7 Claims, 2 Drawing Sheets

PROTECTIVE SLEEVE AND METHOD OF ASSEMBLING THE PROTECTIVE SLEEVE TO AN OBJECT TO BE PROTECTED

FIELD OF THE INVENTION

The present invention relates to resilient, elastomeric tubes for environmentally protecting and/or electrically insulating an elongate object in general and an electrical conductor in particular.

BACKGROUND OF THE INVENTION

Connections of electrical cable, wherein two ends of different cables are joined by an electrically conductive connector or a cable end is terminated by connection to a device such as a lug for connection to a bus, must be protected from the environment and electrically insulated so that the connection is electrically isolated. One method of protecting the connection is to provide a resilient, elastomeric tube which has an inner diameter approximately that of the connection and force the tube over the connection.

The difficulty arises in forcing the tube along the cable and over the connection. The preferred material for the elastomeric tube is silicone rubber, although other elastomers may be used. Silicone and other elastomers have a relatively high surface friction, thus a tube made from these materials does not slide easily relative to the cable and powdered or other lubricants such as oil or grease must be used to achieve assembly of the tube to the connection. This method is extremely messy and requires considerable cleaning by the assembler of his or her person and the cable after the tube has been assembled to the cable.

To avoid the use of separate lubricants, manufacturers including Varflex Corporation of Rome, N.Y., U.S.A. and Markel Corporation of Norristown, Penna., provide flexible tubular products which are braided from cotton, rayon, nylon, glass or other fibers, and impregnated, coated, or impregnated and coated with an electrical insulating material such as the silicone rubber discussed above. Thus, in this construction, the tube comprises an inner core of braid which is permanently and intimately attached to a covering jacket of insulating material. The braided core permits the insulating material to be slid over an object such as an electrical wire because the braid acts as a solid lubricant for the higher friction insulating material.

While this construction is effective to permit the insulating material to be easily assembled to a small wire, there are drawbacks associated with the construction. Since the braided core and the jacket are integral, the braided core is always exposed at the ends of the tube. This permits fluids to be drawn into the tube by a wicking action unless the ends are sealed by some means such as tape. It is also noted that these products are only available in small sizes, i.e., less than approximately 10 mm in diameter, so the applicability of these products to large objects, such as large diameter electrical cable, is questionable.

It is therefore an object of this invention to provide means for facilitating the assembly of a resilient, elastomeric, protective tube to an electrical cable, or, more generally, an elongated object to be protected, without the use of powdered or fluid lubricants and to ensure that the protective tube seals the object from contaminants.

SUMMARY OF THE INVENTION

The object of this invention is accomplished by providing a resilient, elastomeric tube sized to fit over an elongated object, which may be an electrical cable and/or cable connection, and a separate sleeve disposed inside the elastomeric tube and having a surface friction sufficiently low so as to allow the elastomeric tube to be slid over the object to be protected so that the elastomeric tube may be assembled to the object without the use of lubricants. The present invention also includes a method of protecting an object including providing the resilient, elastomeric tube and the sleeve, locating the sleeve within the tube and sliding the elastomeric tube and the sleeve over the object to be protected. Finally the invention includes a method for protecting the object wherein it is desired to have the elastomeric tube contact the object directly to provide a seal between the tube and the object, which method includes the steps of providing the elastomeric tube and the sleeve, folding one or both of the ends of the tube back upon itself by stretching the end or ends of the tube to increase the diameter of the tube and positioning the end or ends of the tube along the length of the tube, locating the sleeve within the tube, either providing a sleeve having a length which corresponds to the length of the tube when the end or ends are folded back along the length of the tube or trimming the length of the sleeve to correspond to the length of the tube when its end or ends are folded back along its length, sliding the elastomeric tube and the sleeve located therein over the object to be protected and unfolding the end or ends of the tube which had been folded along the length of the tube so that the tube end or ends extend beyond the end or ends of the sleeve to contact the object to be protected.

Important features of the invention are its ability to stretch over an object having a substantially larger cross-sectional dimension than the internal diameter of the protective tube and its ability to conform closely to the object as well as additional components, when the object is an electrical cable, such as grounding straps, metallic foil or tapes.

BRIEF DESCRIPTION OF THE DRAWINGS

The present invention will be described with reference to the accompanying drawings, wherein like numbers refer to like parts in the several views, and wherein.

DETAILED DESCRIPTION OF THE PREFERRED EMBODIMENT

Figure 1:
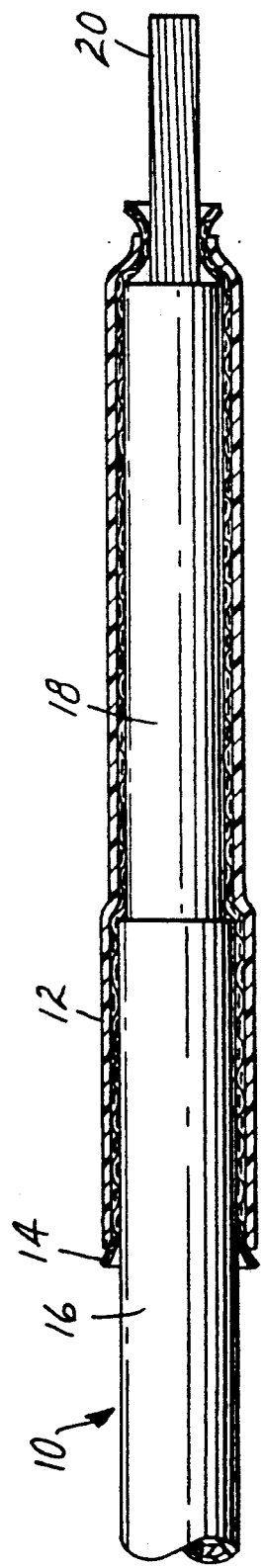
FIG. 1 is a side view of an electrical cable with one embodiment of the present invention shown in cross-section.

FIG. 1 illustrates one possible application of the present invention wherein an electrical cable, generally indicated as 10, is covered by a resilient, elastomeric tube 12 disposed over a sleeve 14. The cable 10 typically includes a jacket 16 covering electrical insulation 18 which electrically insulates and environmentally protects a conductor 20 within the cable 10. The elastomeric tube 12 is provided to additionally electrically insulate and environmentally protect the cable 10 or a junction of which the cable 10 is a part.

Although the cable 10 is shown with a bare end of the conductor 20 exposed, the conductor 20 will usually be connected to the conductor of another cable or attached to a termination device such as a lug which might be used to connect the cable 10 to, for example, a bus bar. It is also noted that although an electrical cable 10 is illustrated throughout the drawings as the object protected by the tube 12 and sleeve 14 of the invention, any elongated object could advantageously utilize the teaching of the present invention. For example, a vehicle part such as an axle could be protected by the tube 12 and sleeve 14 for shipping. Also, it should be apparent that objects having cross-sectional shapes other than circular, such as square, oval or triangular, could be protected by the tube 12 and sleeve 14, so long as the dimensions of the tube 12 and sleeve 14 are properly chosen so as to accommodate the object. Thus, although the invention will be described with respect to an electrical cable 10, it should be borne in mind that the invention has more general application.

The tube 12 is constructed of any resilient, elastomeric material which may be stretched and will attempt to regain its original shape and size when stretched. In electrical applications particularly, the tube 12 is preferably a natural or synthetic rubber and, most preferably, silicone rubber. This material, in this form, has been used in the past to environmentally protect and electrically insulate an electrical cable 10, but, because the tube 12 is usually sized to be stretched over the insulation 18 and jacket 16 of the cable 10, and because silicone rubber has a relatively high surface friction, either a powder lubricant or one of a liquid or semi-liquid consistency, such a grease, was necessary to permit an assembler to force the tube 12 over the cable 10. Any such assembly is limited to short lengths of protective tubing 12 since the sliding resistance increases with tube length, and since depletion of the powder or liquid lubricant along the tube 12 and cable 10 interface likewise increases the force required to slide the protective tube 12 along the surface of the cable 10. The purpose of the present invention is to eliminate the mess associated with the use of such conventional lubricants, and to allow substantially longer lengths of protective tube 12 to be installed over the cable 10. It should be noted at this point that it is usually most desirable that the relaxed diameter of the tube 12 is chosen to be smaller than the cross-sectional dimension of the object to be protected so that the tube 12 will conform to and seal against the object. The tube 12, however, may be the same size or larger in diameter that the cross-sectional dimension of the object. In these cases, the sleeve 14 is still necessary for assembly of the tube 12 to the object since the flexibility and surface friction of the tube 12 will not permit the tube 12 to be easily assembled to the object, particularly if the object is long relative to its cross-sectional dimensions.

Figure 2:
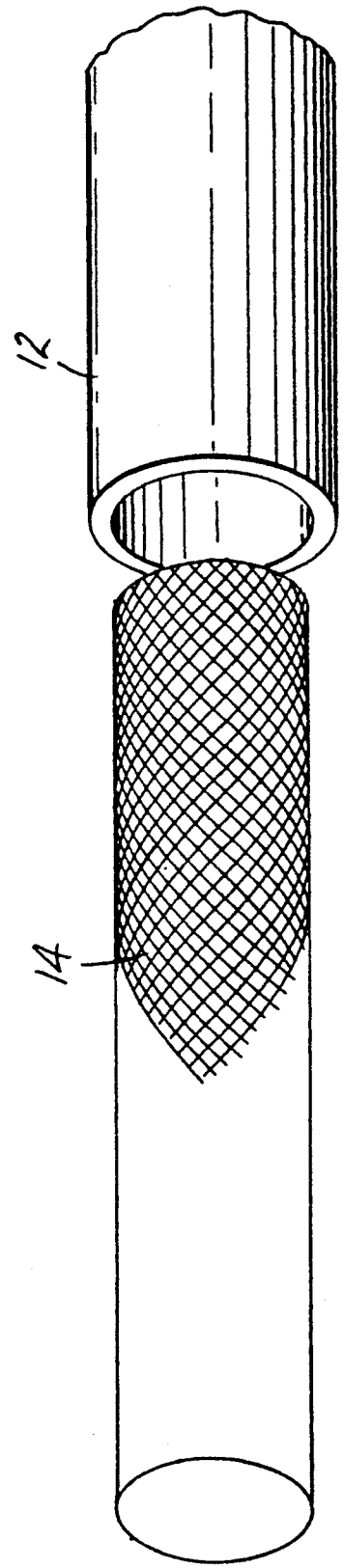
FIG. 2 is a perspective view of an elastomeric protective tube and a sleeve comprising the present invention.

The sleeve 14 acts as a solid lubricant for the tube 12 and permits the tube 12 to be pushed and slid over the cable 10 without the use of the powder or liquid lubricants described above. The sleeve 14 may be any material which may be stretched to at least a limited extent or that its design, by weaving or braiding, allows for radial expansion regardless of the elasticity of the material from which the sleeve 14 is produced and which exhibits a relative low surface friction. Suitable materials of which the sleeve 14 may be constructed have been found to be any of the polyesters, any fluoropolymer, polyamide, polyetheretherketone, polyphenylene sulfide, or nylon. The sleeve 14 may be molded or extruded but is preferably a fabric of monofilament or multifilament fibers woven into a cylinder, as best seen in FIG. 2. The woven sleeve is preferably braided with the fibers oriented at an acute angle to the longitudinal axis of the sleeve 14, because this construction allows the sleeve 14 to be expanded or contracted in diameter simply by compressing or stretching the sleeve 14, respectively, in a longitudinal direction. Thus one woven sleeve 14 may be used with cables 10, or any object, of various cross-sectional shapes and dimensions or an object having varying cross-sectional shapes or dimensions along its length. A woven or braided construction permits, as noted above, inelastic materials to be used such as graphite, aramid, glass or ceramic fibers or even metal strands. It has also been observed that a woven or braided construction decreases the area of contact between the sleeve 14 and the object and thus enhances the ability of the sleeve 14 to slide relative to the object.

FIG. 2 illustrates assembly of the sleeve 14 to the tube 12 in preparation for assembly of the two to the cable 10 or other object to be protected. Depending on the relaxed diameters and the respective lengths of the tube 12 and the sleeve 14, the sleeve 14 may simply be pushed into the tube 12 or can be pulled into the tube 12, with the aid of a "fish" wire or string, if necessary.

Once the sleeve 14 has been inserted into the tube 12, the combination is positioned over the small end of the object to be protected, the conductor 20 in the case of the cable 10 of FIG. 1, or is stretched over the end of the object if the smallest diameter of the object is larger than the relaxed diameter of the tube 12 and sleeve 14 combination. The tube 12 and sleeve 14 are then simply pushed along the length of the object until positioned as desired. In FIG. 1 the tube 12 and sleeve 14 have been pushed to a position where the ends of the tube 12 are disposed over the cable jacket 16 and the conductor 20. If it were desired to connect the cable conductor 20 to another cable or to a termination, the tube 12 and sleeve 14 could be pushed further along the cable 10 to expose the conductor 20 fully, the connection to the conductor 20 made and the tube 12 and sleeve 14 pushed toward the conductor 20 end of the cable 10 to cover or partially cover the connection between cables or cable termination. Thus a method of positioning a resilient, elastomeric tube 12 over an object to be protected is to position a sleeve 14 within the tube 12 and slide the tube 12 and sleeve 14 combination over the object to be protected. This method and use of the tube 12 and sleeve 14 of the present invention permits disassembly of the tube 12 from the object, a feature of great utility where the object protected is a cable connection or termination, as inspection or repair of the connection or termination is facilitated.

It should be understood that, although the sleeve 14 is shown in FIG. 1 as extending beyond the ends of the tube 12, the sleeve 14 could be sized in length to match the length of the tube 12 or the ends of the sleeve 14 could be trimmed after the sleeve has been positioned within the tube 12, before or after the tube 12 and sleeve 14 are assembled to the cable 10 or other object to be protected.

Figure 3:
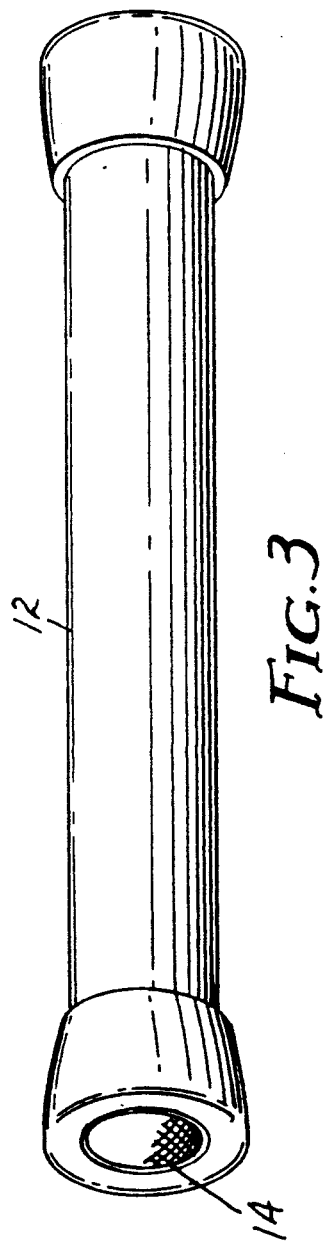
FIG. 3 is a perspective view of the tube and sleeve of FIG. 2 and illustrates an early step in a method of applying the present invention to an electrical cable.
Figure 4:
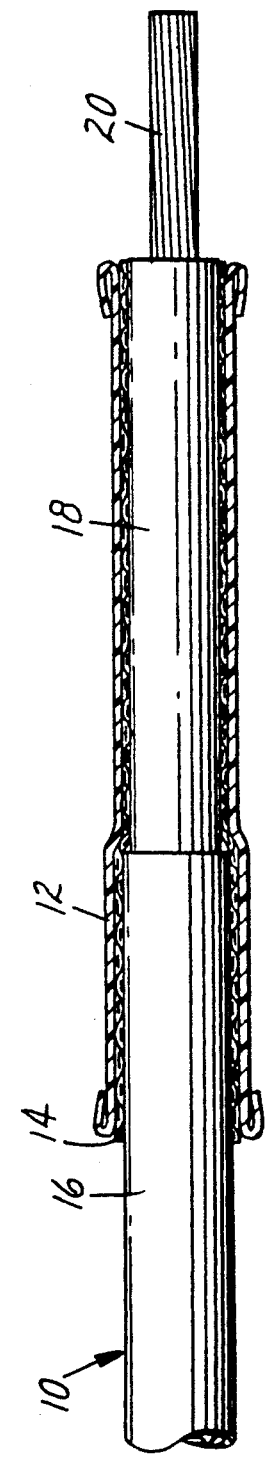
FIG. 4 is an intermediate step in the method of FIG. 3.
Figure 5:
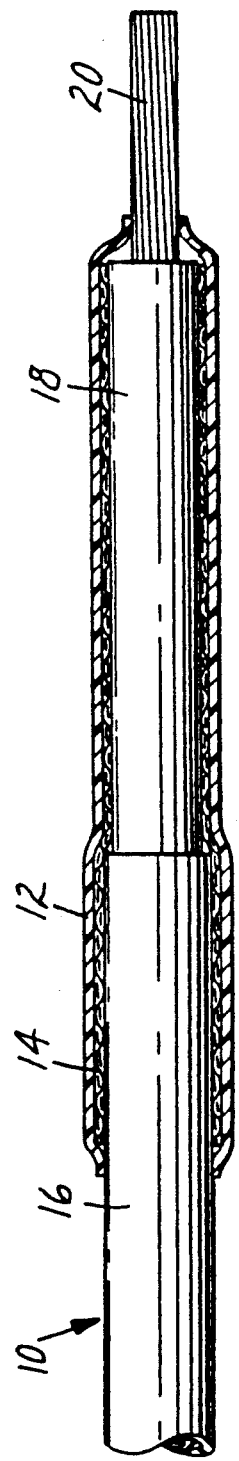
FIG. 5 is the final step of the method of FIGS. 3 and 4.

FIGS. 3-5 illustrate a method of applying the tube 12 and sleeve 14 combination to an object to be protected, again illustrated specifically by an electrical cable 10, wherein it is desired that the ends of the tube 12 contact the cable 10 directly, i. e., without the intervention of the sleeve 14 between the tube 12 and the cable 10 at one or both ends of the tube 12.

In this method, an end or the ends of the tube 12 are folded back on themselves by stretching the tube 12 to increase the diameter of the end of the tube 12 and positioning the end of the tube 12 back along the length of the tube 12. A sleeve 14 is then inserted into the tube 12 and the ends of the sleeve 14 trimmed to the length of the tube 12 with its ends folded back. Rather than trimming the sleeve 14 after insertion into the tube 12, the tube could be cut to the proper length before insertion into the tube 12.

The tube 12 and sleeve 14 combination is then forced over the cable 10 as shown in FIG. 4. Finally, the ends of the tube 12 are unfolded and allowed to contract to contact the cable 10 as shown in FIG. 5, where it can be seen that the ends of the tube 12 contact the cable 10 directly and thus seal the ends of the tube 12 to the cable 10.

Although FIGS. 3-5 illustrate both ends of the tube 12 folded back, it should be recognized that only one end of the tube 12 could be folded back so that eventually only one end of the tube 12 contacts the cable 10 directly. In this instance the sleeve 14 at the other end of the tube 12 could be even with the end of the tube 12 or extend beyond the end of the tube 12.

I claim:

1. A protective assembly for an elongate object comprising:

a non-integral combination comprising an outer tube of resilient, elastomeric material and a sleeve disposed inside said tube, said tube having a relaxed diameter sized to fit over the object and a surface friction such that said tube cannot be slid a substantial distance relative to said object when said tube is disposed over said object;

said sleeve having a surface friction sufficiently low so as to allow said tube to be slid over said object so that said tube may be assembled to said object without the use of lubricants; and wherein said surface friction of said tube relative to the sleeve is higher than said surface friction of said sleeve relative to the object so that the sleeve will not slide relative to said tube as said tube and said sleeve are slid over the object.

2. A protective assembly according to claim 1 wherein said elastomeric tube is silicone rubber.

3. A protective assembly according to claim 1 wherein said sleeve is manufactured from a group of polymers consisting of polyester, fluoropolymer, polyamide, polyetheretherketone, polyphenylene sulfide.

4. A protective assembly according to claim 1 wherein said sleeve is a tubular fabric woven of fibers.

5. A protective assembly according to claim 4 wherein said sleeve is manufactured from a group of materials consisting of polyester, fluoropolymer, polyamide, polyetheretherketone, polyphenylene sulfide, glass, carbon, ceramic and metal.

6. A protective assembly according to claim 5 wherein said sleeve is a cylinder of fibers woven at an angle to the longitudinal axis of said sleeve so that said polymeric sleeve may expand in radial dimension.

7. A protective assembly according to claim 6 wherein said fibers are monofilament fibers.

* * * * *